April 30, 1957     K. H. ROBINSON     2,790,658
TURNBUCKLE WITH INTEGRAL LEVERS
Filed Oct. 12, 1953
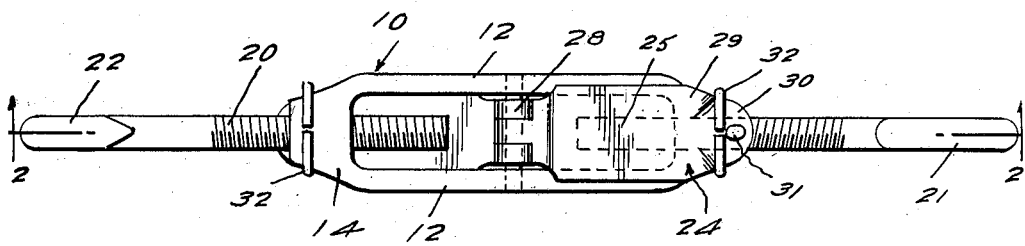
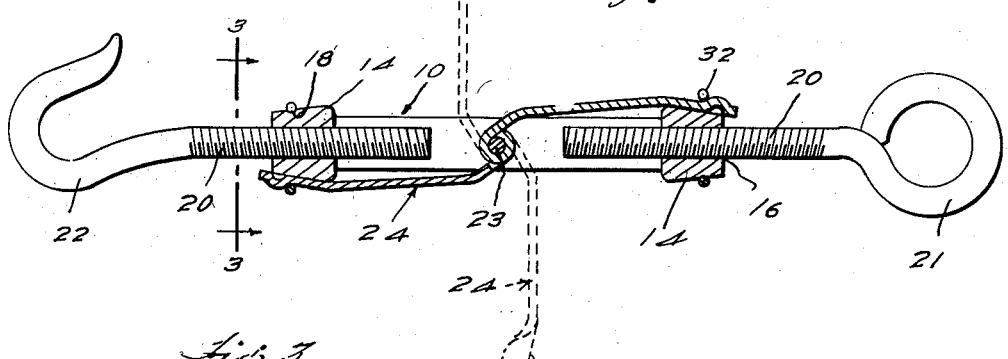
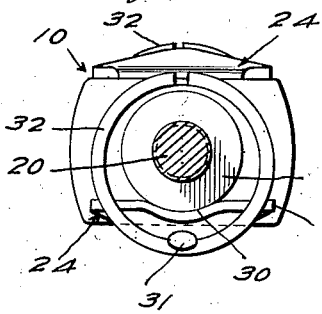
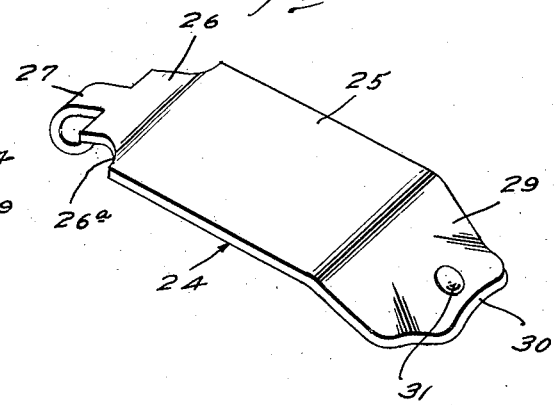
INVENTOR.
Kenneth H. Robinson
BY
Wilfred E. Lawson
ATTY ized Apr. 30, 1957

2,790,658
TURNBUCKLE WITH INTEGRAL LEVERS

Kenneth H. Robinson, Riverside, Calif.

Application October 12, 1953, Serial No. 385,575

2 Claims. (Cl. 287—60)

This invention relates to the class of hardware and is directed particularly to improvements in turnbuckles.

A principal object of the present invention is to provide a novel turnbuckle wherein a means is provided for facilitating the turning of the coupling yoke between the threaded elements whereby the need for the employment of a tool or implement for this purpose is avoided.

Another object of the invention is to provide in a turnbuckle structure, pivoted arms or levers connected with the center of the coupling yoke between the turnbuckle screws, which arms are designed to be swung outwardly to right angular relation with the longitudinal axis of the yoke whereby to provide levers to facilitate turning of the yoke.

Another object of the invention is to provide a structure of the above described character wherein the said arms or levers are designed to lie flat against opposite sides of the yoke, when not needed for use, with means at each end of the yoke for detachably securing the free ends of the arms or levers thereto.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in side elevation of a turnbuckle constructed in accordance with the present invention and showing the lever arms in closed position.

Figure 2 is a longitudinal section taken substantially on the line 2—2 of Figure 1 through the yoke, the lever arms and securing means, the threaded screws being in elevation.

Figure 3 is a transverse section taken substantially on the line 3—3 of Figure 2.

Figure 4 is a perspective view of a single lever arm.

Referring now more particularly to the drawing the numeral 10 generally designates the usual long yoke member of a conventional turnbuckle structure. This yoke member comprises the relatively long side bars 12 which are joined at the ends of the yoke by the nuts 14 through each of which is a threaded bore or passage 16.

The nuts 14, in accordance with the present invention, are externally of circular form and are slightly tapered and each has a shallow channel or groove 18 formed thereabout, for the purpose about to be described.

Each of the nuts 14 has threaded therethrough the usual or conventional screw 20, one of which is here shown as having an eye 21 upon its outer end while the other screw is shown as having a hook 22 upon its outer end. However, it is to be understood that the invention is not limited in any manner as to the form of the outer ends of the screws 20.

In accordance with the present invention there is secured transversely of the side bars 12 of the yoke 10, midway between the ends of the yoke, a pivot pin 23.

Pivotally supported on the pin 23 are the two crank arms or wing members 24, each of which comprises an elongate flat plate portion 25 with an obtusely angled wing 26 at the hinged end and each of which wings 26 terminates in a hinge element or knuckle 27. In one case the hinge knuckle comprises a singular circular or sleeve member as shown in Figure 4 while the opposite lever arm has its hinge member in the form of the two spaced sleeves 28 between which the single sleeve 27 positions. As will be readily seen upon reference to Figure 1 the hinge elements or sleeves 27 and 28 are interconnected and have the hinge pin 23 passed therethrough and the lever arms are positioned on opposite sides of the yoke and extend in opposite directions from the pivot pin.

As is also clearly shown each of the lever arms has the plate portion 25 of a width greater than the width between the bars 12 of the yoke and each arm is of such length that when it is closed down against the side of the yoke the opposite end will lie against the adjacent nut 14.

The said opposite or outer end of each of the plates 25 is also obtusely angled to form the tongue portion 29, which tongue portion at its outer or free end is slightly arcuate as indicated at 30 to roughly conform to the curvature of the nut 14 against which it positions and such outer end portion is also pressed out from the under side of the tongue to form the outstanding button 31.

When the lever arms 24 are closed down against the sides of the yoke so that the ends of the tongues 29 lie against the adjacent nuts 14, a split lock ring 32 is forced onto the tapered end of the nut and over the tongue 29 past the button 31 and engaged in the annular groove 18 to securely hold the arm in closed position.

When it is desired to rotate the yoke 10 for the purpose of drawing the screws 20 together or separating them, the split lock rings 32 are slipped off of the ends of the arms and the arms are swung outwardly to the positions shown in dotted lines in Figure 2 where they will extend at substantially right angles to the yoke forming a cross member by which the operator of the turnbuckle can readily grasp the yoke and turn it as desired.

By the formation of the wing 26 of reduced width there are provided the shoulders 26a at the pivoted ends of the two arms, which, when the arms are swung outwardly to a right angular relation with the yoke, engage the side bars of the yoke and limit such swinging movement.

After the yoke of the turnbuckle has been turned to the desired extent the arms are swung inwardly each against its own side of the yoke and secured by replacing the resilient locking rings 32 around the nuts and inwardly or behind the buttons 31 in the manner illustrated.

From the foregoing it will be seen that there is provided by the present invention a turnbuckle of improved construction by means of which the operation of turning the yoke can be accomplished easily and quickly and without the use of auxiliary tools.

I claim:

1. A turnbuckle comprising an elongate yoke including two spaced side bars and nuts joining the ends thereof, screw members extending through the nuts, a pivot pin secured across between the bars midway between the ends thereof, a pair of elongate lever arms each comprising a plate body having an obtusely angled hinge wing at one end and an obtusely angled tongue at the other end, said hinge wing being of less width than the plate body to extend between the side bars, a hinge knuckle element extending from the end of each wing, said knuckle elements being in aligned relation on said pivot pin, the lever arms lying upon opposite sides of the yoke and each being adapted to have its tongue lie against a nut, and means for securing each tongue to the adjacent nut.

2. A turnbuckle comprising an elongated yoke including two spaced side bars and nuts joining the ends thereof, screw members extending through said nuts, a pivot pin secured across between the bars midway of the ends thereof, a pair of elongated lever arms, each comprising a plate body having a hinge wing at one end, said hinge wing being of less width than the plate body, to extend between the side bars, a hinge knuckle element extending from the end of each wing, said knuckle elements being in aligned relation on said pivot pin, said lever arms lying upon opposite sides of said yoke and means for detachably retaining said lever arms in substantially parallel relationship to said yoke.

References Cited in the file of this patent
UNITED STATES PATENTS
2,648,997 Sawyer _____ Aug. 18, 1953
FOREIGN PATENTS
311,269 Germany _____ Mar. 12, 1919